United States Patent
Knorr

(10) Patent No.: US 12,113,473 B2
(45) Date of Patent: Oct. 8, 2024

(54) METHOD FOR OPERATING A HEATED CATALYTIC CONVERTER, AND HEATED-CATALYTIC-CONVERTER CONTROL SYSTEM

(71) Applicant: Vitesco Technologies GmbH, Regensburg (DE)

(72) Inventor: Rainer Knorr, Munich (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 178 days.

(21) Appl. No.: 17/800,037

(22) PCT Filed: Feb. 4, 2021

(86) PCT No.: PCT/EP2021/052649
§ 371 (c)(1),
(2) Date: Aug. 16, 2022

(87) PCT Pub. No.: WO2021/165048
PCT Pub. Date: Aug. 26, 2021

(65) Prior Publication Data
US 2023/0081744 A1    Mar. 16, 2023

(30) Foreign Application Priority Data

Feb. 20, 2020   (DE) .................. 10 2020 202 192.9

(51) Int. Cl.
*H02P 9/48*   (2006.01)
*F01N 3/08*   (2006.01)
(Continued)

(52) U.S. Cl.
CPC .................. *H02P 9/48* (2013.01); *H02P 9/02* (2013.01); *F01N 3/0892* (2013.01);
(Continued)

(58) Field of Classification Search
CPC combination set(s) only.
See application file for complete search history.

(56) References Cited

U.S. PATENT DOCUMENTS

| 5,731,690 A | 3/1998 | Taniquchi et al. |
| 6,202,615 B1 * | 3/2001 | Pels ........................ F02N 19/04 |
| | | 307/10.6 |

(Continued)

FOREIGN PATENT DOCUMENTS

| DE | 19618548 A1 | 11/1996 |
| DE | 19940802 A1 | 4/2001 |

(Continued)

OTHER PUBLICATIONS

International Search Report and Written Opinion for International Application No. PCT/EP2021/052649, mailed Apr. 7, 2021, with partial English translation, 9 pages.

(Continued)

*Primary Examiner* — Binh Q Tran
(74) *Attorney, Agent, or Firm* — Buchanan, Ingersoll & Rooney PC

(57) ABSTRACT

A method for controlling an electrically heatable catalytic converter that is supplied, by a starter generator, with an output power belonging to the starter generator, wherein the output power of the starter generator is increased by a PWM method, wherein the eCAT monitors an on-board electrical system supply voltage that arises on account of the increase in the output power, the eCAT is activated if the on-board electrical system supply voltage exceeds an upper threshold value, and the eCAT is deactivated if the on-board electrical system supply voltage falls below a lower threshold value.

14 Claims, 6 Drawing Sheets

(51) Int. Cl.
   *F01N 3/20*      (2006.01)
   *F01N 5/02*      (2006.01)
   *H02P 9/02*      (2006.01)
   *H05B 3/20*      (2006.01)
   *H05B 45/325*    (2020.01)
   *H05B 45/33*     (2020.01)

(52) U.S. Cl.
   CPC .......... *F01N 3/2006* (2013.01); *F01N 3/2013* (2013.01); *F01N 5/02* (2013.01); *F01N 2240/04* (2013.01); *F01N 2240/16* (2013.01); *F01N 2550/22* (2013.01); *F01N 2900/0418* (2013.01); *F01N 2900/0422* (2013.01); *H05B 3/20* (2013.01); *H05B 45/325* (2020.01); *H05B 45/33* (2020.01)

(56) References Cited

U.S. PATENT DOCUMENTS

| | | | |
|---|---|---|---|
| 7,007,460 | B2 | 3/2006 | Frieden et al. |
| 2005/0034449 | A1* | 2/2005 | Frieden ................. F01N 3/2006 60/284 |
| 2011/0305601 | A1* | 12/2011 | Kawase ................ F01N 3/2026 422/109 |
| 2012/0303200 | A1* | 11/2012 | Ang ....................... B60K 6/445 701/22 |
| 2018/0030908 | A1* | 2/2018 | Pursifull ............... F02D 35/023 |
| 2019/0338697 | A1* | 11/2019 | Kelly ..................... F02B 37/14 |
| 2021/0222638 | A1* | 7/2021 | Hirooka ................ F01N 3/2026 |

FOREIGN PATENT DOCUMENTS

| | | |
|---|---|---|
| DE | 602004010869 T2 | 12/2008 |
| DE | 102011115746 A1 | 8/2012 |
| DE | 102012202009 A1 | 8/2013 |
| EP | 3264587 A1 | 1/2018 |

OTHER PUBLICATIONS

International Search Report and Written Opinion for International Application No. PCT/EP2021/052649, mailed Apr. 7, 2021, 15 pages (German).

German Examination Report for German Application No. 10 2020 202 192.9, mailed Oct. 7, 2020, with translation, 13 pages.

Cramer et al., "Variable Speed Systems with Permanently Excited Generators—Drehzahlvariable Systeme mit permanent erregten Generatoren", Dec. 31, 1999, 14 pages, XP002802503, Retrieved from the Internet: https://docplayer.org/35408527-Systeme-mit-permanent-erregten-generatoren.html (abstract only).

Otto et al., "The System Development of Electrically Heated Catalyst (EHC) for the LEV and EU III Legislation—Die Systementwicklung des elektrisch heizbaren katalysators (E-Kat) für die LEV/ULEV und EU III Gesetzgebung", SAE International, International Conference & Exposition, Detroit, MI, Feb. 27-Mar. 2, 1995, 24 pages (translation).

* cited by examiner

METHOD FOR OPERATING A HEATED CATALYTIC CONVERTER, AND HEATED-CATALYTIC-CONVERTER CONTROL SYSTEM

CROSS REFERENCE TO RELATED APPLICATIONS

This application is the U.S. National Phase Application of PCT International Application No. PCT/EP2021/052649, filed Feb. 4, 2021, which claims priority to German Patent Application No. 10 2020 202 192.9, filed Feb. 20, 2020, the contents of such applications being incorporated by reference herein.

FIELD OF THE INVENTION

The invention relates to a method for operating a heated catalytic converter and the use thereof in a heated catalytic converter control system. Reducing emissions of motor vehicles with internal combustion engines is becoming increasingly important due to environmental requirements. Currently, these emissions should be minimized immediately after the start-up of the cold internal combustion engine. Electrically heatable catalytic converters (eCATs) are used to achieve this. Vehicles, in particular motor vehicles with internal combustion engines, can hereby be considerably improved in respect of their emissions, since the catalytic converter can already be brought to its operating temperature at the start-up, or before the start-up, of the internal combustion engine.

BACKGROUND OF THE INVENTION

PWM (pulse width modulation) is a frequently used method for electrically regulating consumers, in particular in the case of a small power consumption, but also a large power consumption, such as in the case of an electrically heatable catalytic converter. The electrical power demand thereof can be 4 kW or more. PWM regulation is considerably less expensive than a supply solution involving DC-DC.

In a configuration of this kind, the PWM regulation typically operates at frequencies of 0-10 Hz. Usually, such powers can only be provided from an on-board electrical system with voltages over 36 V, such as the 48 V on-board electrical system, for example. The electrical heating of the catalytic converter system takes place very quickly. To achieve temperature regulation—the catalytic converter should be operated above 300° C., but should also not be overheated—electrical power regulation can be provided, for example by way of PWM regulation. Power regulation using a DC-DC converter (DC/DC) is also conceivable, but very cost-intensive.

In one arrangement, the eCAT is supplied with power by an electric machine, such as a (belt) starter generator (BSG) and a battery, usually a lithium battery, for example.

Normally, the starter generator or BSG provides the average required entire electrical power of the vehicle, even if the eCAT is activated. However, in PWM operation with temperature regulation, the starter generator or BSG sometimes cannot follow the power requirement of the eCAT, since PWM operation always entails activating and deactivating the maximum heating power of the eCAT. The average heating power can only be influenced by the PWM operation. In this case, the battery is also loaded, or completely charged and discharged.

Upon deactivation of the starter generator or BSG, the battery is charged and therefore energy is buffer-stored since there is a positive load change.

If the eCAT is at operating temperature, it is usually kept at temperature by the hot exhaust gas of the internal combustion engine. There are also operating modes, however, in which this is no longer sufficient. "Engine OFF coasting" or "start/stop" are mentioned here. In these cases, the eCAT has to be kept at temperature so as to not fall below what is known as the "light OFF" temperature. These are, however, operating states in which the entire electrical heating power of the eCAT is not needed and therefore power regulation is the aim. Not least, this also has to happen for efficiency reasons.

In order to avoid overheating of the eCAT, the average electrical heating power of the eCAT is restricted using PWM. Energy is transferred in and out of the battery, however, since the starter generator or BSG generally cannot follow the power requirement of the eCAT so quickly. This operating mode results in additional ageing for the battery, which can have negative consequences.

The additional ageing of the battery as a result of the PWM regulation is an undesirable situation. In PWM regulation, the current increases very quickly and the starter generator or BSG cannot follow this current. Very large power fluctuations can arise, which can also lead to overvoltages at the battery, in particular at low temperatures, for example below 0° C.

PWM regulation can therefore have a negative effect on the battery, since this leads to increased energy throughput and therefore to increased ageing. Ideally, all the power for the eCAT should come directly from the starter generator or BSG without temporary buffer storage in the battery. This is not possible, since the starter generator or BSG, in interaction with the internal combustion engine, is too slow for the rate of current increase of the eCAT.

The heating of the eCAT consists of a heating resistor that upon activation results in a current flow, without a notable delay.

SUMMARY OF THE INVENTION

Therefore, an aspect of the invention is a method for controlling or operating an electrically heatable catalytic converter that minimizes the above negative effects and constitutes improved operation in the on-board electrical system of a motor vehicle. It is likewise an aspect of the invention to provide an electrically heatable catalytic converter that can carry out a method of this kind. It is also an aspect of the invention to provide a vehicle having a catalytic converter of this kind.

The method according to an aspect of the invention is based on the knowledge that the starter generator, for example a belt starter generator (BSG), operates together with the engine control system and the eCAT. The engine control system requires an increased average electrical output power in the form of PWM regulation or in the form of a PWM method at, for example, 5 Hz. The starter generator, such as the BSG, for example, will follow the PWM method and provide the increased average output power. The eCAT is "focused" by the engine control system and waits for a positive voltage change in the on-board electrical system supply voltage, which is caused by an increase in the electrical output power by the engine control system. To this end, the eCAT monitors the on-board electrical system supply voltage that arises on account of the increase in the output power. If the on-board electrical system supply voltage exceeds an upper threshold value, the eCAT will counteract the increase in the on-board electrical system supply voltage or a voltage change resulting therefrom by being activated. Power is drawn by activating the eCAT. If the on-board electrical system supply voltage falls below a lower threshold value (which is, for example, the result of the eCAT which is activated and drawing power), the eCAT is temporarily deactivated again. The eCAT thus remains activated for as long as the on-board electrical system supply voltage is above the upper threshold value and the on-board electrical system supply voltage does not fall below the lower threshold value.

An equalizing average on-board electrical system supply voltage is achieved automatically by monitoring the on-board electrical system supply voltage, which for example can be effected by a controller of the eCAT, and by the triggered activation and deactivation of the eCAT. This results in improved operation in the on-board electrical system of a vehicle, since voltage spikes in the on-board electrical system supply voltage can be minimized, for example.

The on-board electrical system supply voltage will increase again, however, as a result of the deactivation of the eCAT. One aspect of the invention makes provision for the deactivated eCAT (the controller of the eCAT actually remains active) to continue to monitor the on-board electrical system supply voltage that arises. If the on-board electrical system supply voltage exceeds the upper threshold value again, the eCAT is activated again.

This triggered activation and deactivation of the eCAT preferably takes place at a higher frequency than the frequency of the required PWM regulation by the engine control system.

The triggered activation and deactivation of the starter generator takes place until the increased output power is covered by the eCAT.

The subordinate PWM operation of the eCAT is ended by the eCAT remaining activated until the first pulse of the PWM of the starter generator or BSG is withdrawn again. In this case, the regulation operates in the reverse direction. The eCAT heating waits until the voltage falls below a certain voltage threshold value and is deactivated. As a result, the voltage will increase again until the voltage again exceeds a certain threshold value. The eCAT heating is then activated again. This is carried out until the power is completely withdrawn by the starter generator or BSG. The eCAT then waits for the next pulse of the PWM by the starter generator or BSG. The entire sequence is carried out until the superordinate PWM is withdrawn by the engine control system. The average heating power of the eCAT is therefore set by the engine control system and not by the controller of the eCAT. Said controller only follows the superordinate PWM of the engine control system, as it were. The interaction can occur so exactly that the voltage in the on-board electrical system remains constant or relatively constant.

In a further embodiment, the eCAT heating is also used to stabilize the on-board electrical system voltage. This can in particular also be used when one load is intended to be disconnected and another load is intended to be connected. As a result of latencies in the CAN connection of the loads, this can cause undesired power spikes or power excess. The latencies could be bridged by the temporary PWM operation of the eCAT heating until the actual load has begun its operation and the starter generator or BSG provides the additional electrical power necessary for this.

In a further embodiment, the impedance of the on-board electrical system of a vehicle is also incorporated. The inductance of the on-board electrical system can be concomitantly used to reduce the current increase of the electrically heatable eCAT.

BRIEF DESCRIPTION OF THE DRAWINGS

Aspects of the invention will be explained below in exemplary embodiments on the basis of the associated drawings, in which.

DETAILED DESCRIPTION OF THE PREFERRED EMBODIMENTS

Figure 1:
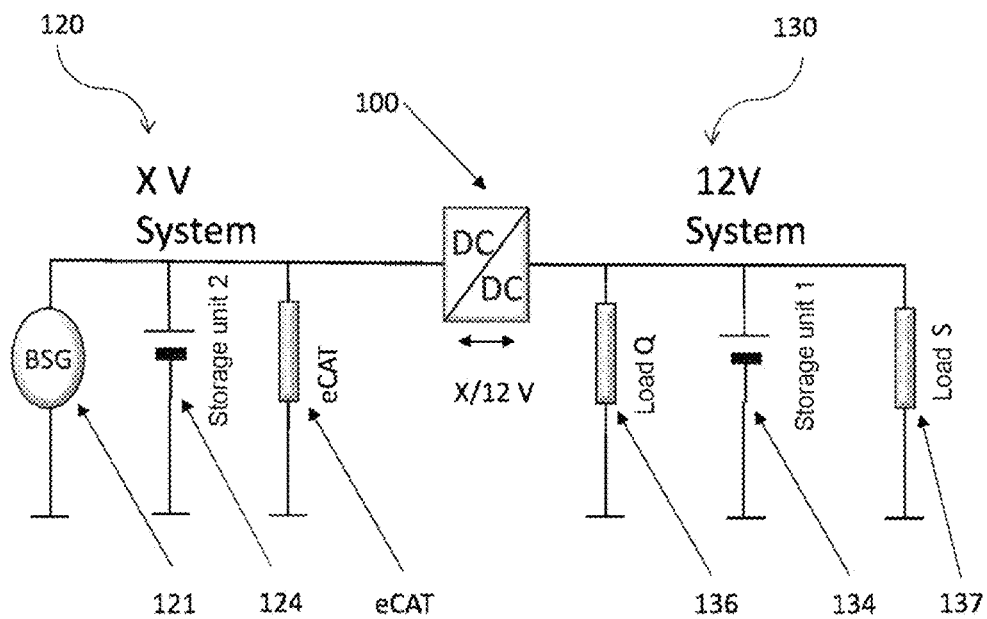
FIG. 1 shows a system structure for eCAT temperature regulation.

FIG. 1 shows an arrangement of the heatable catalytic converter (eCAT) in a two-voltage on-board electrical system. The eCAT is connected in a 48 V system 120, wherein other voltages can certainly also be used.

In this arrangement, the eCAT is supplied with power by an electric machine, such as a starter generator 121 and a battery 124, usually a lithium battery, for example. In one embodiment, the starter generator can be a 48 volt belt starter generator (BSG), which is also why the designation BSG is chosen.

For the sake of completeness, the 48 V on-board electrical system or higher low-voltage system 120 is coupled to a 12 V system 130 via a DC-DC converter DC-DC 100. Further loads 136, 137, and a further battery or a further storage unit 134, can be found in the 12 V system 130.

Normally, the starter generator or BSG provides the average required power, even if the eCAT is activated. In the case of PWM operation with temperature regulation, however, there is a possibility of the starter generator or BSG not being able to follow the power requirement of the eCAT. In this case, the battery 124 is also loaded. Upon deactivation of the starter generator or BSG, the battery is charged and therefore energy is buffer-stored since there is a positive load change.

Figure 2:
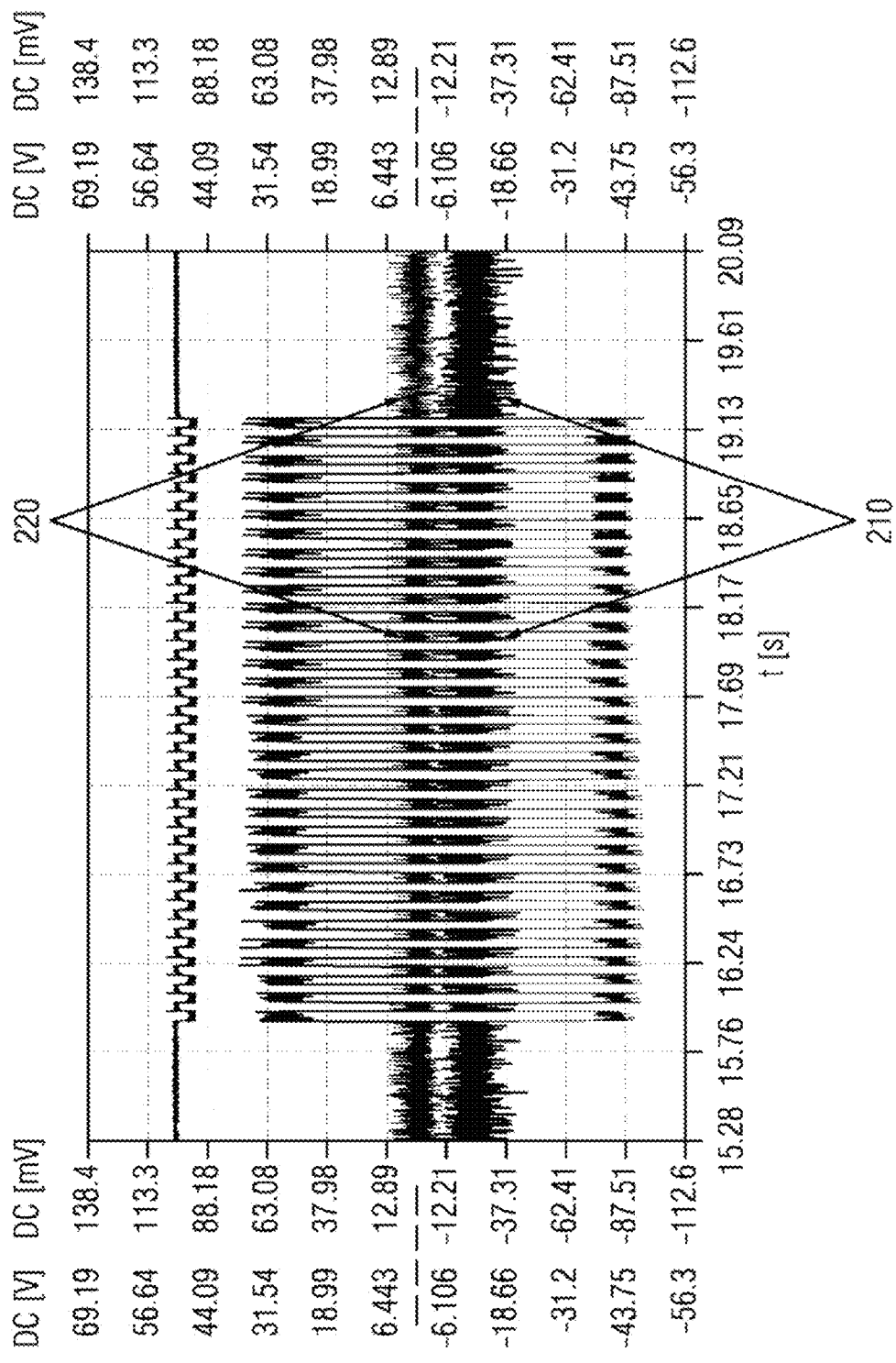
FIG. 2 shows the power profile during PWM.

FIG. 2 illustrates the method of operation of an eCAT with PWM regulation. The power or the current at the eCAT 220 flows counter to the current from the storage unit or the battery 210. Power regulation using a DC-DC converter is also conceivable, but very cost-intensive. The aim is therefore PWM regulation as a cost-effective exemplary embodiment. PWM regulation is considerably less expensive than the supply solution involving DC-DC converters. In one embodiment, the PWM regulation operates at frequencies of 0-10 Hz.

Figure 3:
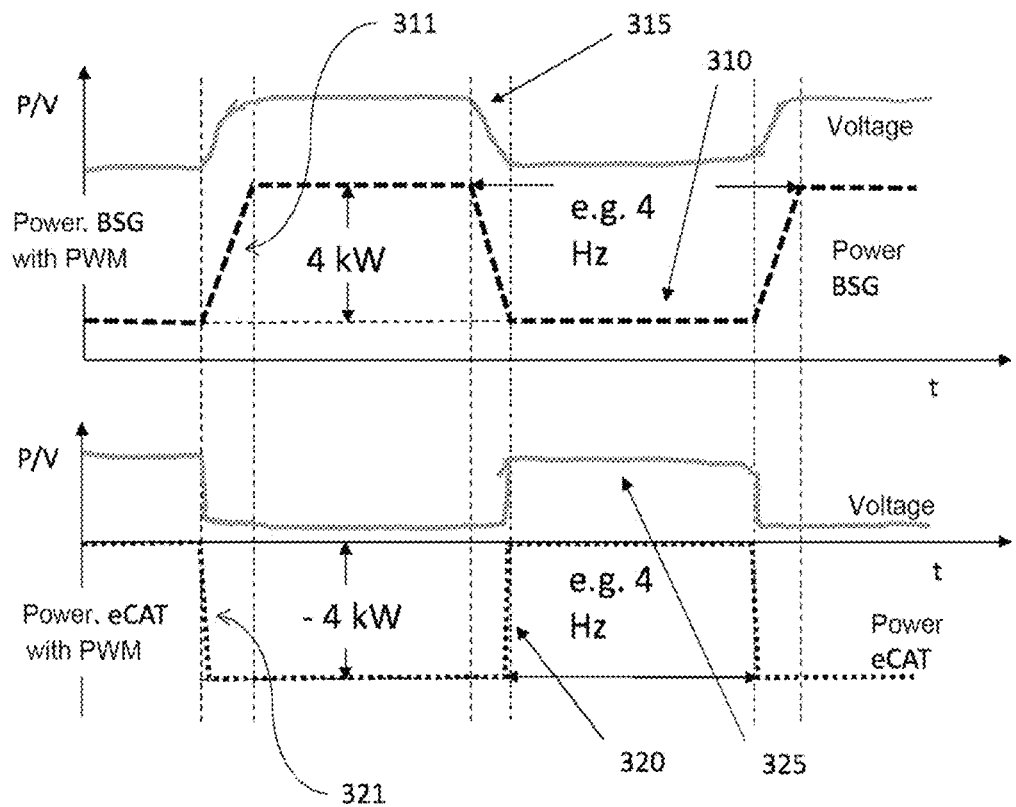
FIG. 3 shows simple regulation of the temperature.

FIG. 3 shows the activation and deactivation behavior of the starter generator or BSG and eCAT in the PWM method. The power at the eCAT 320, and as a result the voltage 325 present in the 48 V system 120, change as a result of the internal combustion engine requirements. The output power or power 310 provided at the starter generator or BSG also changes, since the starter generator or BSG is always striving to provide the required power. The voltage at the starter generator or BSG 315 fluctuates, however. The increase in the power demand for the eCAT 321 is considerably sharper than the increase in the power provided by the starter generator or BSG 311. The decrease in the power demand for the eCAT is likewise considerably sharper than the decrease in the power provided by the starter generator or BSG. In this example, the difference in power then has to be compensated for by a storage unit or a battery. In particular for a lithium battery, this behavior comprising brief charging and discharging can lead to premature ageing and undesired failures.

It is desirable for the power imbalance to be kept as low as possible. This is ensured using the inventive method.

Figure 4:
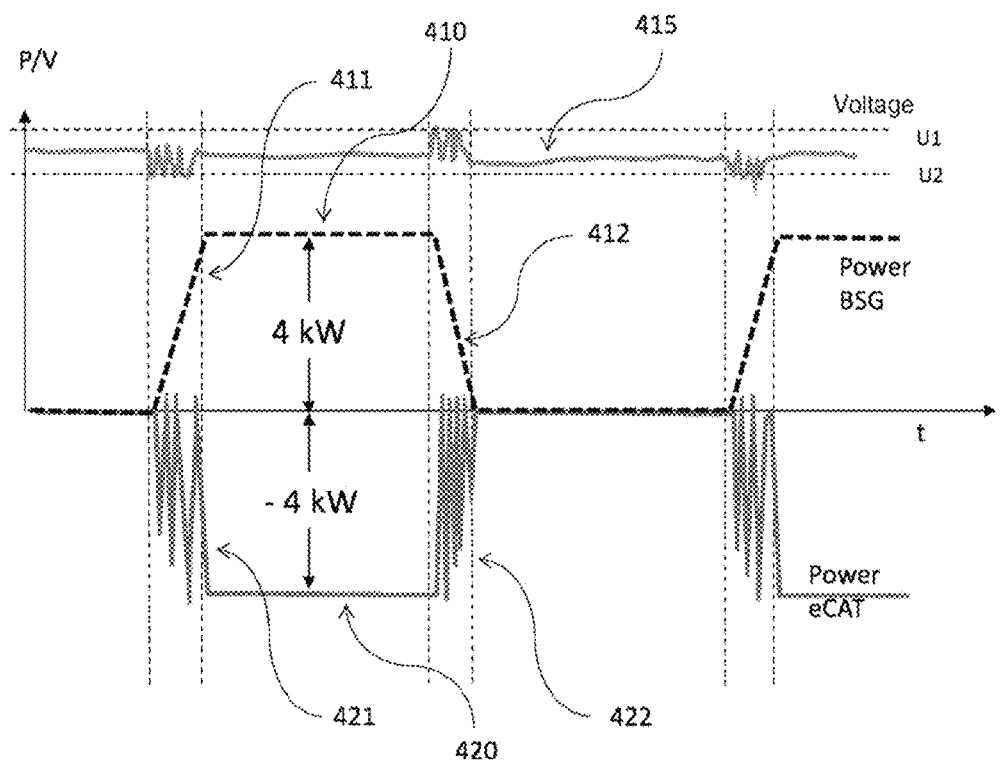
FIG. 4 shows a voltage profile.

FIG. 4 illustrates one embodiment of the method according to the invention. The eCAT monitors the on-board electrical system supply voltage 415. After the eCAT has been activated, the voltage drops. The eCAT is deactivated again as soon as the voltage falls below the lower threshold value. The eCAT continues to monitor the on-board electrical system supply voltage, which then increases. As soon as the voltage reaches the upper threshold value, the eCAT is activated again (region 422). The power demand by the eCAT 420 is created and removed in accordance with the PWM method, and the starter generator or BSG supplies power or current 410. Since the increase in the eCAT demand rises more quickly 421 than the starter generator or BSG can increase its power 411, the eCAT is activated and deactivated using fast PWM. The power of the eCAT also drops more quickly than the starter generator or BSG can reduce its power 412. The eCAT is correspondingly activated and deactivated using fast PWM.

The eCAT is therefore supplied with power by a starter generator or BSG, for example, wherein the starter generator or BSG is activated and deactivated using a slow PWM method and the eCAT is activated or deactivated using a fast PWM method. By way of example, the PWM method for the eCAT can switch at least 10 times as quickly, or at least 100 times as quickly, or at least 1000 times as quickly as the PWM method for the starter generator or BSG. In one embodiment, the PWM method for the eCAT has a constant frequency, since a constant frequency can be easier to calculate and to switch. It can be of interest, however, to use a variable PWM frequency for the starter generator or BSG in order to optimally tune the power consumption or to keep the power imbalance as low as possible. By way of example, a longer activation phase could be used at the beginning of the activation than at the end of the activation. The PWM power of the eCAT can always remain constant, since this depends on the physical variables of the eCAT itself and the inductance of the connected on-board electrical system and can be set independently.

Figure 5:
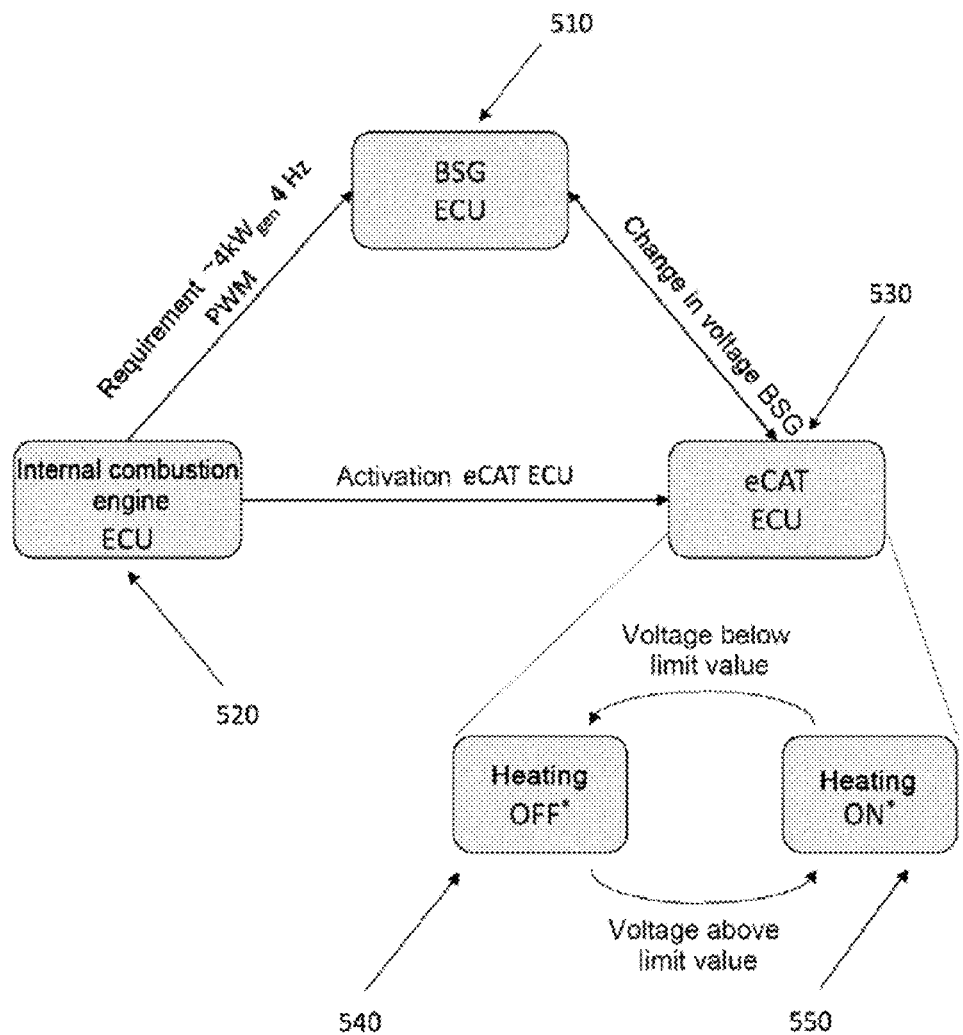
FIG. 5 shows some aspects of an inventive device.

FIG. 5 shows different participants in and states of the inventive system. The internal combustion engine ECU (electronic control unit) 520 reports a demand of 4 kW to the starter generator or BSG ECU 510. At the same time, the internal combustion engine ECU signals a demand for electrical heating of the eCAT, this is to say an activation signal, to the eCAT ECU or supply monitoring unit 530. The supply monitoring unit 530 accordingly changes the eCAT between the states of Heating Off 540 and Heating On 550 depending on whether the supply voltage is above or below the respective limit value or threshold value.

The inventive method is particularly relevant if the internal combustion engine does not need the full eCAT power and therefore requires PWM from the starter generator or BSG, for example each activated and deactivated with a 50/50 operating ratio. The starter generator or BSG can then be activated and deactivated using a slow PWM method in order to provide the desired eCAT power, and is activated and deactivated using a fast PWM method on the eCAT in order to regulate the supply voltage level. This will not buffer-store any, or will only buffer-store a minimum of, electrical power.

The inductance of the on-board electrical system can also help to smooth voltage variations. Using fast PWM, sufficient current can be stored in the available on-board electrical system inductance to smooth voltage variations therewith. In this way, the 48 V system or a higher low-voltage system 120 can be kept stable. The inductance of the on-board electrical system accordingly has to be also taken into account, or the time delay, which results from this, in the activation and deactivation of the eCAT, or the calculation of the activation and deactivation time.

Figure 6:
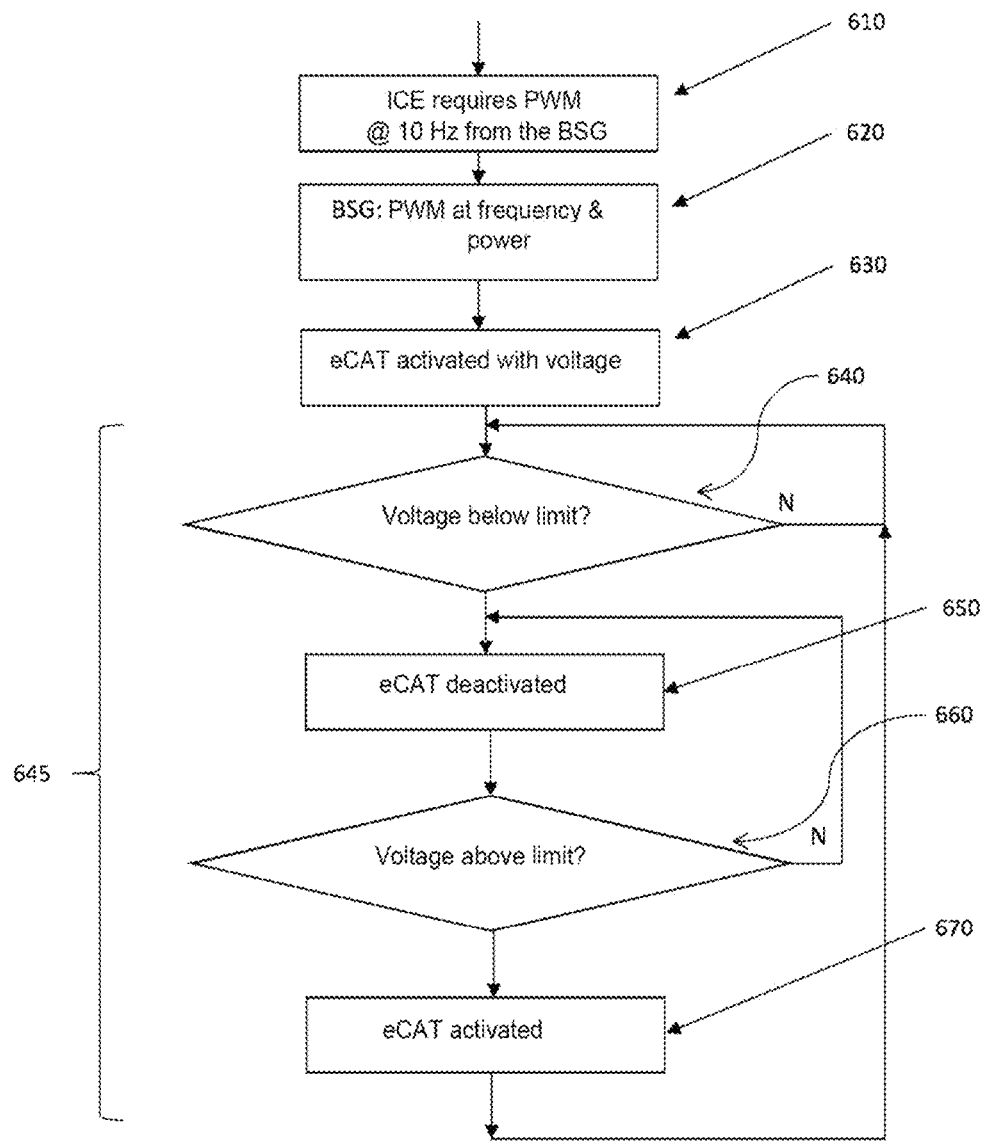
FIG. 6 shows the control sequence.

FIG. 6 illustrates the method for controlling an electrically heatable catalytic converter, wherein the eCAT monitors the supply voltage. In step 610, the internal combustion engine requires PWM at 10 Hz from the starter generator or BSG. In step 620, the starter generator or BSG starts with PWM at the required frequency and power. In step 630, the eCAT is activated in the event of an appropriate voltage increase. Following the activation, the eCAT is briefly deactivated if the voltage falls below a lower threshold.

Step 640 shows how the voltage is monitored. If the voltage is sufficient (640, N), the eCAT remains in operation; if the voltage is insufficient, the eCAT is deactivated (step 650). In (650), the electrically heatable catalytic converter (eCAT) is controlled in such a way that the eCAT monitors the supply voltage and, after activation, is briefly deactivated again if the voltage falls below a lower threshold value. The eCAT continues to monitor the supply voltage in step 660. The eCAT remains deactivated for as long as the voltage remains below the lower threshold value (660, N). The eCAT monitors the supply voltage further and is activated again briefly if the supply voltage exceeds an upper threshold value. As soon as the supply voltage is above the upper threshold value again, the eCAT is activated again (step 670). Steps 640, 650, 660, 670 are performed in loop 645.

Suitable eCAT (PWM) regulation can phase in and phase out, in terms of energy, high-current loads in the on-board electrical system without large voltage dips. The charging voltage of the battery (for example a lithium ion battery) can likewise be kept at a safe level by way of the PWM regulation of the eCAT; this can be of interest in particular in the event of a load dump or voltage spike that suddenly occurs at a motor vehicle alternator after load shedding. Lithium ion batteries can be damaged by an overvoltage. Even an overvoltage of, for example, 50 mV in relation to the end-of-charge voltage of 4.1 V to 4.3 V per cell, depending on the product, can be critical.

The PWM regulation of the eCAT can be used to smooth the voltage spike by way of rapid activation or by way of an increased activation period. Otherwise, the PWM regulation of the eCAT can be used as an on-board electrical system protection device against overvoltages.

In this exemplary embodiment of the invention, the brief deactivation or activation is performed as a PWM method. Therefore, the power is regulated by PWM, but other power regulation methods are also known to those skilled in the art.

The loop having the steps 640, 650, 660, 670 is continued until the eCAT is no longer needed, or the internal combustion engine does not require any further PWM from the starter generator or BSG.

The invention claimed is:

1. A method for controlling an electrically heatable catalytic converter that is supplied, by a starter generator, with an electrical output power belonging to the starter generator, the method comprising:

increasing the output power of the starter generator by a PWM method, monitoring, by the eCAT, an on-board electrical system supply voltage that arises on account of the increase in the output power of the starter generator, activating the eCAT if the on-board electrical system supply voltage exceeds an upper threshold value, and deactivating the eCAT if the on-board electrical system supply voltage falls below a lower threshold value.

2. The method as claimed in claim 1, wherein the eCAT continues to monitor the on-board electrical system supply voltage in the deactivated state, and the eCAT is activated again if the on-board electrical system supply voltage exceeds the upper threshold value.

3. The method as claimed in claim 1, wherein the activation and/or deactivation of the eCAT is conducted as a PWM method.

4. The method as claimed in claim 3, wherein the PWM method for the starter generator is slower than the PWM method for activating and/or deactivating the eCAT.

5. The method as claimed in claim 4, wherein the PWM method for activating and/or deactivating the eCAT is at least 10 times faster than the PWM method for the starter generator.

6. The method as claimed in claim 3, wherein the PWM method for the eCAT has a constant frequency.

7. The method as claimed in claim 1, wherein an inductance of the on-board electrical system is also taken into account in the activation and deactivation of the eCAT.

8. The method as claimed in claim 3, wherein the PWM method for activating and/or deactivating the eCAT is suitable for and intended to phase in and phase out, in terms of energy, high-current loads in the on-board electrical system without large voltage dips.

9. The method as claimed in claim 3, wherein the charging voltage of a battery is kept at a safe level by way of the PWM method for activating and/or deactivating the eCAT.

10. The method as claimed in claim 3, wherein the PWM method for activating and/or deactivating the eCAT is used as an on-board electrical system protection device against overvoltages.

11. An electrically heatable catalytic converter that is supplied, by a starter generator, with an electrical output power belonging to the starter generator, wherein the eCAT has a supply monitoring unit that monitors an on-board electrical system supply voltage, which arises, for the eCAT and is designed to carry out a method comprising:

increasing the output power of the starter generator by a PWM method, monitoring, by the eCAT, an on-board electrical system supply voltage that arises on account of the increase in the output power of the starter generator, activating the eCAT if the on-board electrical system supply voltage exceeds an upper threshold value, and deactivating the eCAT if the on-board electrical system supply voltage falls below a lower threshold value.

12. A vehicle having an electrically heatable catalytic converter that is supplied, by a starter generator, with an electrical output power belonging to the starter generator, wherein the eCAT has a supply monitoring unit that monitors an on-board electrical system supply voltage, which arises, for the eCAT and is designed to carry out a method comprising:

increasing the output power of the starter generator by a PWM method, monitoring, by the eCAT, an on-board electrical system supply voltage that arises on account of the increase in the output power of the starter generator, activating the eCAT if the on-board electrical system supply voltage exceeds an upper threshold value, and deactivating the eCAT if the on-board electrical system supply voltage falls below a lower threshold value.

13. The method as claimed in claim 4, wherein the PWM method for activating and/or deactivating the eCAT is at least 100 times faster than the PWM method for the starter generator.

14. The method as claimed in claim 4, wherein the PWM method for activating and/or deactivating the eCAT is at least 1000 times faster than the PWM method for the starter generator.

* * * * *